US 6,710,502 B2

(12) United States Patent
Maslov et al.

(10) Patent No.: US 6,710,502 B2
(45) Date of Patent: Mar. 23, 2004

(54) ROTARY ELECTRIC MOTOR HAVING AT LEAST THREE AXIALLY ALIGNED STATOR POLES AND/OR ROTOR POLES

(75) Inventors: Boris A. Maslov, Reston, VA (US); Zareh Soghomonian, Reston, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/067,305

(22) Filed: Feb. 7, 2002

(65) Prior Publication Data

US 2003/0193265 A1 Oct. 16, 2003

(51) Int. Cl.[7] .................................................. H02K 1/12
(52) U.S. Cl. ................... 310/254; 310/112; 310/156.25
(58) Field of Search ........................ 310/254, 216, 310/217, 218, 156.25, 156.12, 49 R, 112

(56) References Cited

U.S. PATENT DOCUMENTS

| 3,914,859 A | * | 10/1975 | Pierson .......................... 29/596 |
| 4,012,651 A | * | 3/1977 | Burson ......................... 310/153 |
| 4,357,551 A | | 11/1982 | Dulondel ....................... 310/46 |
| 4,754,207 A | * | 6/1988 | Heidelberg et al. ......... 318/254 |
| 4,786,834 A | | 11/1988 | Grant et al. |
| 4,864,176 A | | 9/1989 | Miller et al. |
| 5,030,867 A | * | 7/1991 | Yamada et al. ........ 310/156.25 |
| 5,854,521 A | * | 12/1998 | Nolle ........................... 310/12 |
| 6,169,350 B1 | | 1/2001 | Yang ............................ 310/216 |
| 6,204,587 B1 | * | 3/2001 | Torok et al. ................. 310/181 |
| 6,384,496 B1 | | 5/2002 | Pyntikov et al. |

FOREIGN PATENT DOCUMENTS

| EP | 0790695 A1 | 8/1997 | .......... H02K/21/12 |
| GB | 628763 A | 9/1949 | |
| JP | 57-110063 A | 7/1962 | .......... H02K/21/14 |
| JP | 09-028068 A | 1/1997 | .......... H02K/21/14 |

* cited by examiner

Primary Examiner—Karl Tamai
Assistant Examiner—Hanh Nguyen
(74) Attorney, Agent, or Firm—McDermott, Will & Emery (57) ABSTRACT

A rotary electric motor has a stator with a plurality of separate and ferromagnetically isolated electromagnet core segments disposed coaxially about an axis of rotation. The core segments are supported by a non-ferromagnetic structure. Each core segment has at least three poles aligned in a direction parallel to the axis. Windings are formed on portions linking the poles so that, when energized, the center pole forms a magnetic polarity opposite to the magnetic polarity of the other poles. The rotor comprises a plurality of axial rows of permanent magnets disposed circumferentially along the air gap. Each axial row of rotor magnets comprises a center permanent magnet of one magnetic polarity and, at each axial side thereof, a permanent magnet of a magnetic polarity opposite to the polarity of the center magnet.

11 Claims, 8 Drawing Sheets

ROTARY ELECTRIC MOTOR HAVING AT LEAST THREE AXIALLY ALIGNED STATOR POLES AND/OR ROTOR POLES

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, and U.S. application Ser. No. 09/966,101 of Maslov et al., filed Oct. 1, 2001, all commonly assigned with the present application. The disclosures of these applications are incorporated by reference herein.

FIELD OF THE INVENTION

The present invention relates to rotary electric motors, more particularly to motors having a plurality of rotor elements and stator elements comprising a plurality of poles that are aligned in a direction parallel to the axis of rotation of the motor.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application of Maslov et al., Ser. No. 09/826,423, identifies and addresses the need for an improved motor amenable to simplified manufacture and capable of efficient and flexible operating characteristics. In a vehicle drive environment, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The copending related U.S. applications incorporate electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain desirable.

The Maslov et al. applications recognize that isolation of the electromagnet groups permits individual concentration of flux in the magnetic cores of the groups, with virtually no flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group.

Copending related U.S. patent application of Maslov et al., Ser. No. 09/966,101 describes benefits to be gained from further utilization of three dimensional aspects of motor structure. Advantages are recognized from the use of materials such as a soft magnetically permeable medium that is amenable to formation of a variety of particular shapes. For example, core material may be manufactured from soft magnet grades of Fe, SiFe, SiFeCo, SiFeP powder material, each of which has a unique power loss, permeability and saturation level. Core geometries and core dimensions of stator elements, with relevant tolerances, can be formed without the need to form laminations and thus optimize the magnetic potential gradient developed between coupled poles of rotor permanent magnets and stator electromagnets. A structural configuration is disclosed wherein axially aligned stator poles and axially aligned rotor magnets provide highly concentrated flux distribution. Such configuration provides a greater number of poles with the same individual active air gap surface areas and/or greater total active air gap surface area than conventional motors having the same air gap diameter.

DISCLOSURE OF THE INVENTION

As described above, benefits are attributable to the provision of ferromagnetically isolated stator segments in a configuration in which stator pole pairs and rotor magnet pairs are aligned in the axial direction. The present invention furthers the above-described needs of the prior art and provides additional advantages for configurations such as the isolated individual pole pair arrangements disclosed in the above identified Maslov et al. applications.

Advantages of the present invention are achieved, at least in part, by further development of motor structural configurations in which multiple poles are in axial alignment. The structural features of one such configuration of the invention are embodied in a motor that comprises a rotor and stator each disposed in an angular ring configuration and spaced from each other by an annular radial air gap. The stator comprises a plurality of separate integral electromagnet core segments disposed coaxially about an axis of rotation to form an annular cylindrical stator ring bounded by an inner and outer diameter. Each stator core segment comprises a center pole and at least two lateral poles, the poles of the segment integrally joined by linking portions to form an axial row of stator poles in an integral, ferromagnetically isolated, unit. Windings formed on the linking portions are connected to develop, when energized with current, a first magnetic polarity in each of the lateral poles and an opposite magnetic polarity in the center pole. Reversal of the direction of current flow through the windings effects reversal of magnetic polarities of the poles.

The stator core segments are affixed to a non-ferromagnetic support structure which maintains distribution of the segments in the ring configuration without ferromagnetic contact with each other. The plurality of stator core segments may have substantially the same pole configurations that are structurally positioned to form two annular sets of lateral poles and one annular set of center poles, each set comprising a respective pole in each of the core segments. The poles of each set are substantially coextensive in the axial direction. The stator poles have pole face surface areas facing the radial air gap. The surface areas of the center pole faces preferably are different from the surface areas of the lateral pole faces.

The rotor preferably comprises a plurality of axial rows of permanent magnet dipoles disposed circumferentially along the air gap. Each axial row comprises a center permanent magnet of one magnetic polarity and, at each axial side thereof, a lateral permanent magnet of a magnetic polarity opposite to the polarity of the center magnet. The magnetic polarities of the permanent magnets of each axial row are of opposite polarity to magnets in an adjacent axial row. Each of the permanent magnet dipoles has a surface area that faces the air gap and extends in the axial and circumferential directions, with one magnetic polarity at the air gap surface and the opposite magnetic polarity at an opposite surface facing away from the air gap. The surfaces of the magnets of each row are coextensive in the circumferential direction. The surface of each permanent magnet of a row is coextensive in the axial direction with the surface of a corresponding magnet in each of the other rows. The lengths of the permanent magnets in the axial direction may be correlated with the axial lengths of the stator poles. The axial lengths of the center permanent magnets may thus be different from the axial lengths of the lateral permanent magnets. Preferably, the axial lengths of all lateral permanent magnets are equal.

The individual rotor permanent magnet dipoles preferably are of relatively thin cross section and mounted upon a back iron ring. The back iron may be segmented or of a single piece. Housing this rotor structure is a nonmagnetic outer ring within which the permanent magnets and back iron ring are mounted. Various back iron segment configurations can be selected to permit various flux path concentrations. In an axially segmented configuration, a plurality of separate back iron segments are formed, each segment having mounted thereon an axial row of permanent magnets. In an alternative configuration, the back iron ring is formed of two axially spaced segments, each segment bridging the center permanent magnet and a respective lateral permanent magnet of the corresponding axial permanent magnet row. Each axially spaced segment may be further segmented by providing spaces between rows. In the latter arrangement, each axial row of magnets has one back iron segment bridging the center magnet and a lateral magnet and another back iron segment bridging the center magnet and the other lateral magnet.

Flux path concentration can be further adjusted by setting a spacing dimension between adjacent permanent magnets advantageous to correlate the rotor configuration with the stator pole geometry. The arrangement of rotor magnets may be uniform, wherein all magnets are spaced a set distance from adjoining magnets or wherein all magnets are in direct contact with each other. Alternatively, the spacing among the rotor magnets may be non-uniform. For example, adjacent permanent magnets of each axial row may be separated from each other but in direct contact with adjacent magnets in the circumferential direction.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
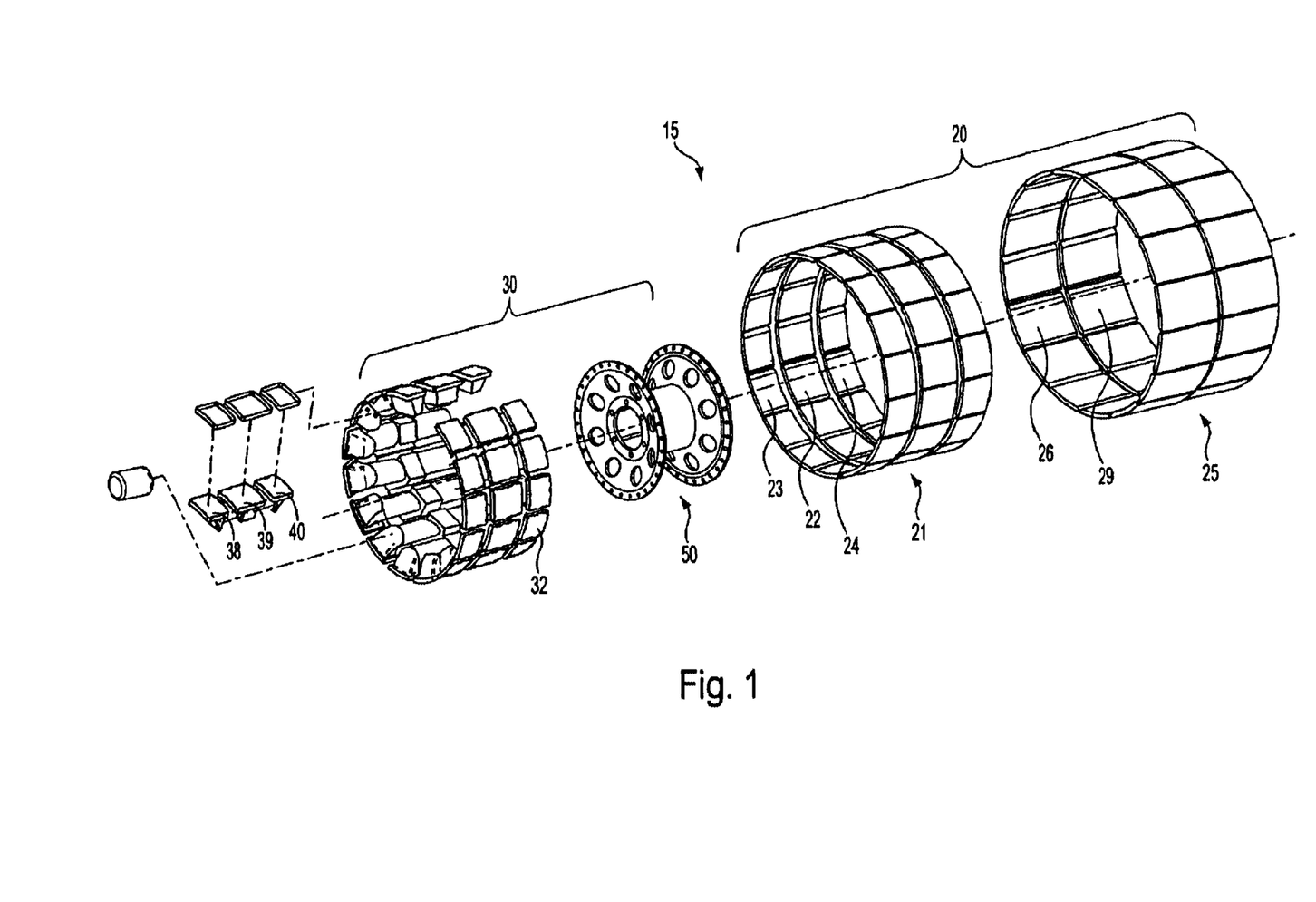
FIG. 1 is an exploded view illustrating components of a first embodiment of the motor of the present invention.
Figure 2:
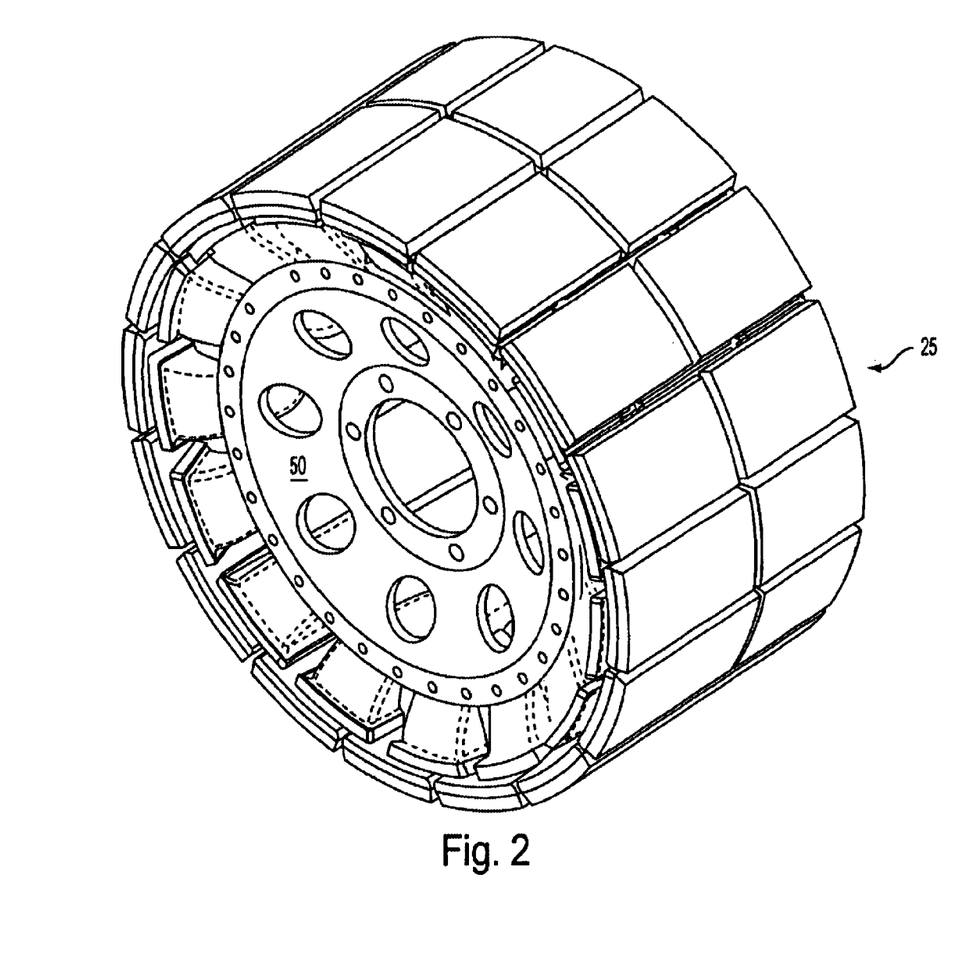
FIG. 2 is a three-dimensional perspective view of the motor of FIG. 1.

FIG. 1 is a three-dimensional exploded view illustrating components of a first embodiment of the invention. The components in combination form the motor construction illustrated in FIG. 2. Motor 15 comprises annular permanent magnet rotor 20 and annular stator structure 30 separated by a radial air gap. A plurality of ferromagnetically isolated stator segment elements 32, made of magnetically permeable material, are supported by support structure 50, which maintains ferromagnetic isolation of the segments. The rotor comprises a permanent magnet section 21, circumferentially distributed about the air gap, and a back iron ring 25 upon which the permanent magnets are mounted.

Stator support structure 50 may be affixed to a stationary shaft, in a manner similar to the structure disclosed in the above-identified Ser. No. 09/966,101 application, the disclosure of which is incorporated by reference herein. The rotor may be mounted within a housing that is journalled to the shaft through appropriate bushings and bearings.

Figure 3:
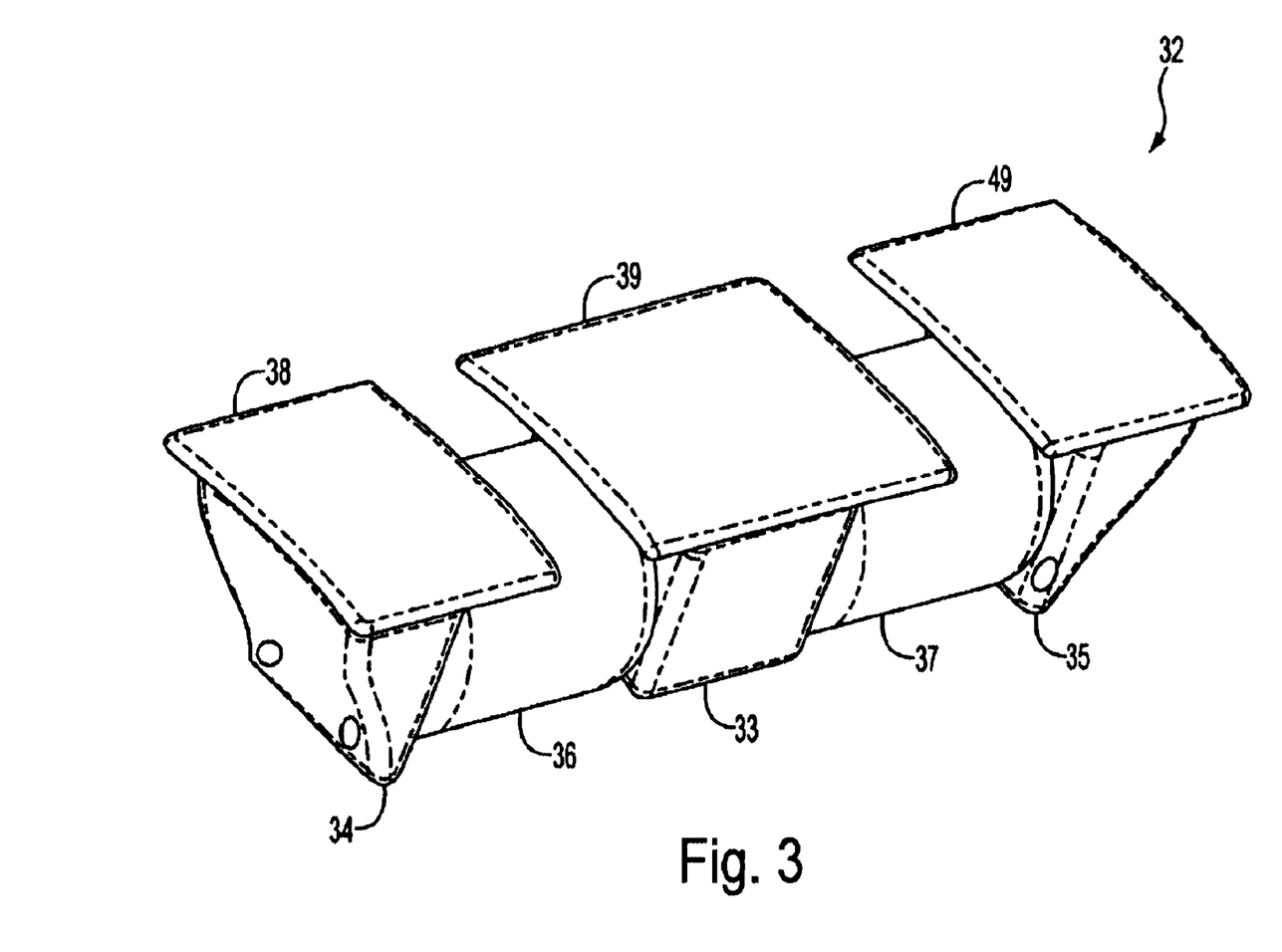
FIG. 3 is a more detailed view of a stator core element of the first embodiment of the invention.

Stator core element 32 is shown in more detail in FIG. 3. Segment 32 is a unitary structure formed of a magnetically permeable material with center pole 33 and lateral poles 34 and 35 joined in the axial direction by linking portions upon which are formed windings 36 and 37. Lateral poles 34 and 35 have tapered configurations in which the cross sectional area increases in the radial direction toward the air gap, culminating in enlarged pole face surfaces 38 and 40 respectively. The tapered pole configuration optimizes the concentration of flux in the core so that maximum flux can be directed across the air gap. Center pole 33 has a pole face 39. The illustrated core geometry, as well as variations thereof, may be formed using powder metal technology from soft magnet grades, for example, of Fe, SiFe, SiFeCo, or SiFeP powder material. Powder metal technology provides a flexibility of construction design that is not available from the conventional formation of stacked metal laminations. Minimization of eddy current losses, conventionally addressed by the use of laminated cores, is obtained by selection of the appropriate powder metal material composition in accordance with the known high electrical resistivity of powder metal materials. The pole face surface areas conform with the cylindrical radial air gap geometry and have circumferential and axial dimensions.

Each stator core element is an electromagnet. Windings 36 and 37 are wound such that, when energized, the center pole 33 is of one magnetic polarity and the lateral poles 34 and 35 are both of the opposite magnetic polarity. Reversal of the direction of energizing current, in known manner, effects reversal of the magnetic polarities of each of the poles. Preferably, the surface areas of lateral pole faces 38 and 40 are substantially the same and smaller than the surface area of center pole face 39. Windings 36 and 37 may be connected in series or parallel and wound in appropriate clockwise or counterclockwise directions on the linking portions to obtain these magnetic polarity relationships, such winding configuration being well within the skill of the artisan. It is to be understood that the configuration shown in FIG. 3 is for purpose of illustration and that the particular dimensions shown may be varied in accordance with desired performance characteristics. For example, the surface area relationships among the three pole faces and the distances between them in the axial direction may be varied in accordance with the invention.

Figure 4:
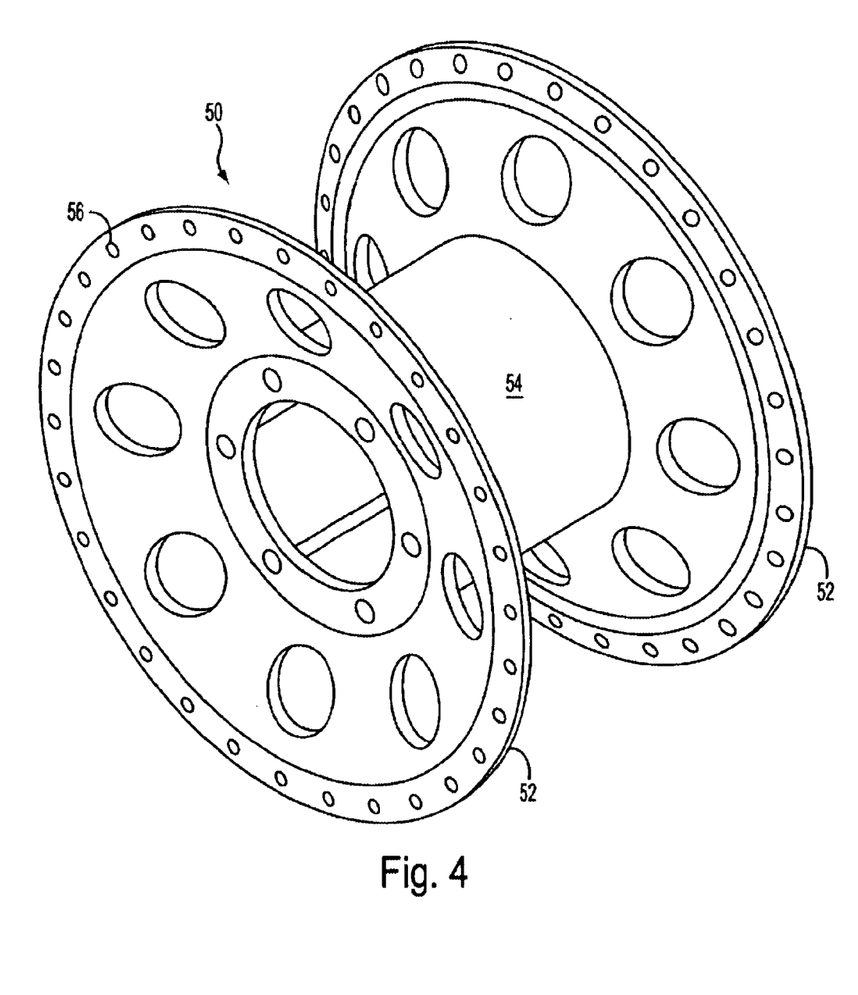
FIG. 4 is a more detailed view of stator support structure of the first embodiment of the invention.
Figure 5:
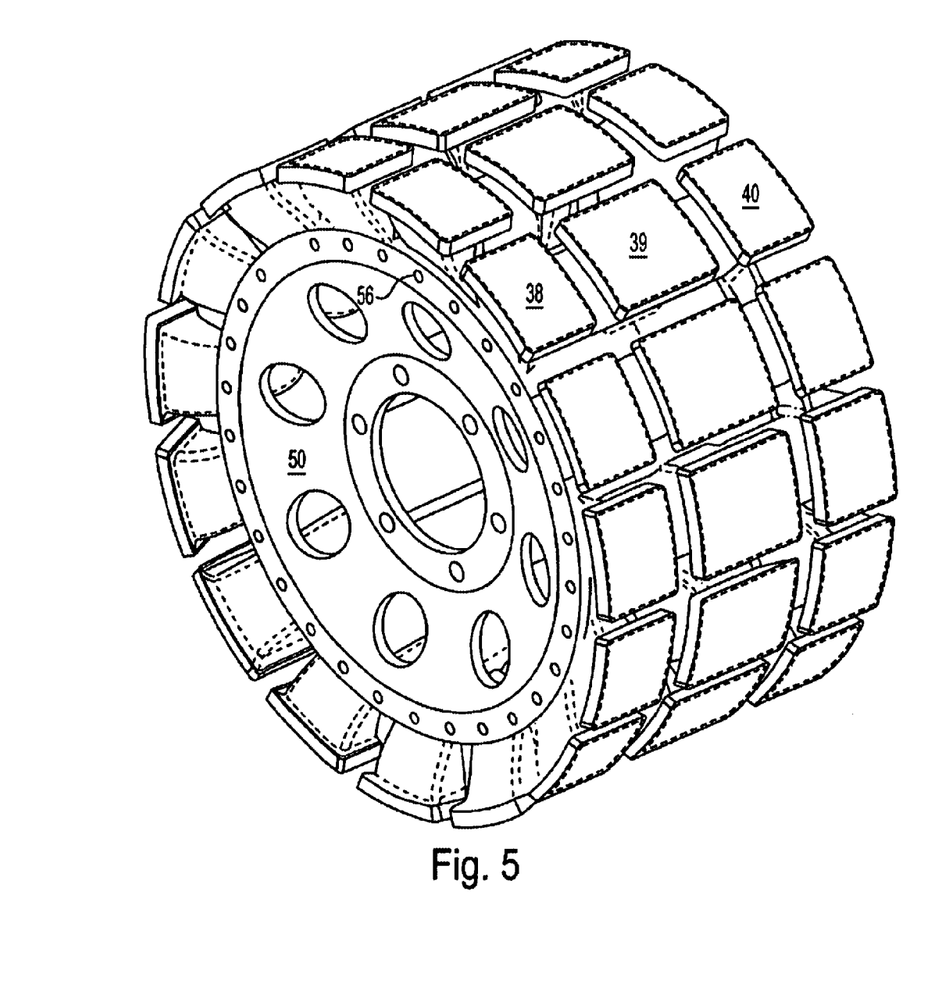
FIG. 5 is a three-dimensional perspective view of the stator core elements in combination with the support structure of the present invention.

Stator support structure 50 is shown in more detail in FIG. 4. The support structure, which is formed of a non-magnetically permeable material such as aluminum, comprises two plate portions 52 joined to each side of a cylindrical portion 54. Near the outer circular peripheries of plate portions 52 are holes 56. The holes are positioned to mate with holes at the bottom of the stator core segments, whereby the core segments may be mounted to the support structure in conventional manner. The plates are spaced from each other appropriately to be secured to, and to sandwich, the stator core segments at each axial side thereof via the mating holes. Thus an annular ring is formed of stator core segments that are coextensively aligned in the axial direction, as illustrated in FIG. 5. As the stator core segments are not in contact with each other and are mounted to a non-permeable structure, flux paths created by each of the stator element electromagnets are isolated from each other.

Figure 6:
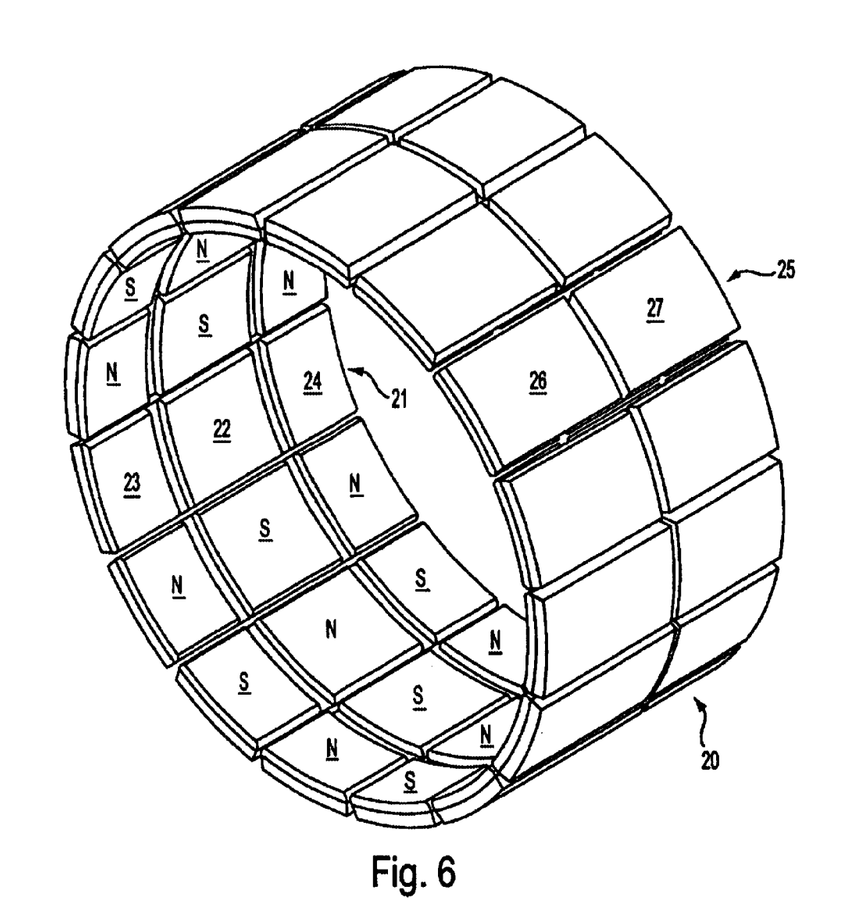
FIG. 6 is a three-dimensional perspective view of the rotor of the first embodiment of the invention.

FIG. 6 is a three-dimensional perspective view of rotor 20. A plurality of axial rows 21 of dipole magnets are circumferentially distributed about the air gap and surround the stator. Row 21 comprises a center magnet 22 and lateral magnets 23 and 24. Each magnet has a surface area facing the air gap that extends in the axial and circumferential directions and is relatively thin in cross section. The magnets of each axial row are coextensive in the circumferential direction. The di-pole magnetic orientation provides one magnetic polarity at the surface facing the air gap and an opposite magnetic polarity on the opposite back surface. In each axial row of rotor magnets, center magnet 22 exhibits a magnetic polarity at the air gap surface that is opposite to the magnetic polarity of lateral magnets 23 and 24. Axial rows of rotor magnets alternate in magnetic polarity circumferentially along the air gap.

Each permanent magnet of a row is coextensive in the axial direction with a corresponding magnet in each of the other rows. Thus the rotor magnets effectively form three circumferential bands of magnets, the magnets of each band successively alternating in polarity. Lateral magnets 23 and 24 are of substantially equal axial length, individually less than the axial length of center magnet 22. The surface areas of the rotor magnets are correlated with the stator pole face configuration. Surfaces of the magnets in an axial row will each encompass an area of an opposing corresponding stator pole face when the magnet row and a stator core element are in radial alignment during rotation. As illustrated, the rotor magnets are separated from each other to provide finely focussed flux paths that are formed between the rotor and stator elements during motor operation. The spacing between magnets may be varied, or eliminated, in accordance with other motor dimensional relationships without departing from the concept of the invention.

The flux distributions produced by the rotor magnets can be further enhanced by provision of the magnetically permeable back iron ring 25. In this embodiment, the back iron ring is segmented into two axially separated bands which, collectively, are substantially coextensive in the axial direction with the rotor magnets. The bands are further segmented in the circumferential direction thereby forming a first plurality of individual back iron elements 26, shown at the left, and a second plurality of individual back iron elements 27, on the right. Back iron elements 26 and 27 are paired in axial rows that are circumferentially coextensive with an axial row of rotor magnets that are mounted thereto. Back iron element 26 covers lateral magnet 23 and approximately half of center magnet 22. Back iron element 27 covers lateral magnet 24 and approximately the other half of center magnet 22. Reference again is made to the above-identified Ser. No. 09/966,101 application for a more detailed discussion and illustration of various flux distribution patterns for respective variations of axial rotor magnet and back iron units.

Figure 7:
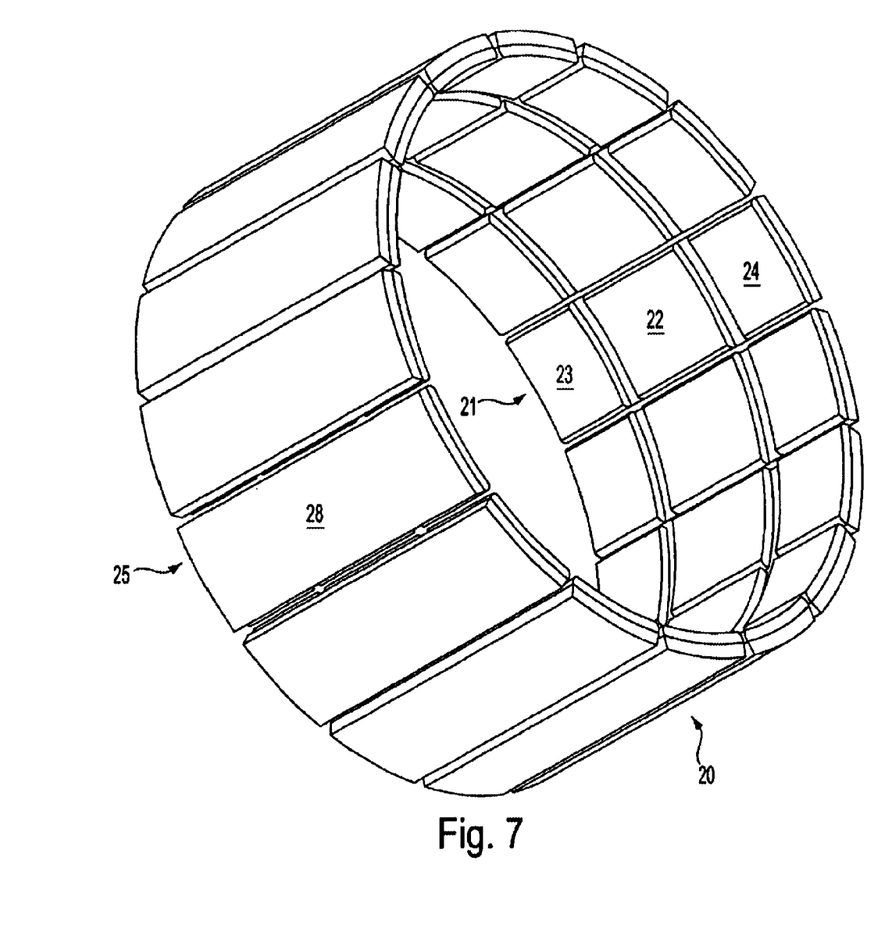
FIG. 7 is a three-dimensional perspective view of a rotor construction of a second embodiment of the invention.
Figure 8:
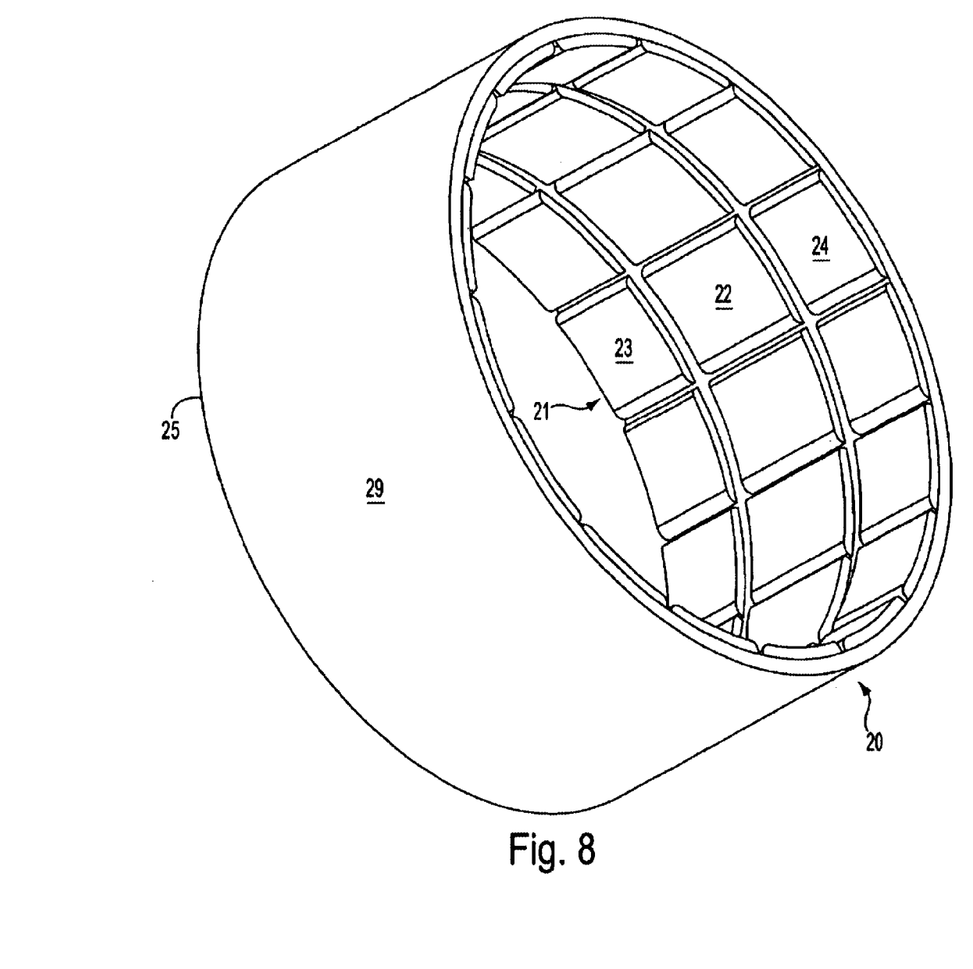
FIG. 8 is a three-dimensional perspective view of a rotor construction of a third embodiment of the invention.

FIG. 7 is a three-dimensional perspective view of a rotor construction of an alternative embodiment of the invention. The back iron ring differs from that shown in FIG. 6 in that, while the circumferential segmentations remain, the axial segmentation has been deleted. Back iron elements 28 extend coextensively in the axial and circumferential directions with the corresponding axial row of magnets that are mounted thereon. FIG. 8 is a three-dimensional perspective view of a rotor construction of yet another alternative embodiment in which a single, non-segmented, back iron ring 29 is provided.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, the motor of the invention can be utilized in a wide range of applications including vehicle drives in which the motor is incorporated into a wheel hub. While it is preferred, in the implementation of a vehicle drive, that the rotor surround the stator, other applications may find advantageous utility with the stator surrounding the rotor. Thus, it is within the contemplation of the invention that each inner and outer annular member may comprise either the stator or rotor and may comprise either the group of electromagnets or group of permanent magnets.

While specific geometric configurations of the stator core elements have been illustrated, it should be recognized that the inventive concept herein encompasses a multitude of variations of these configurations as virtually any shape can be formed using the powder metal technology. Thus a specific core configuration can be tailored to the flux distribution desired.

In addition, the various pole surface areas and spacing relationships among stator and rotor pole surfaces are subject to variation in dependence upon the desired operational functionality. For example, the spacing between elements and element surface areas need not be uniform. In the various embodiments described above, various rotor magnets may be further separated from each other than indicated or, conversely, formed in contact with each other.

What is claimed is:

1. A rotary electric motor comprising:
   a cylindrical annular permanent magnet rotor disposed coaxially about an axis of rotation;
   a stator comprising a plurality of separate electromagnets having respective core segments; and
   a non-ferromagnetic support structure, the stator core segments affixed thereto and distributed without ferromagnetic contact with each other in an annular ring concentric with the rotor and separated therefrom by a radial air gap, the core segments thereby respectively defining separate magnetic paths isolated from each other, wherein each stator core segment further comprises:
      a center pole and two lateral poles having pole face surfaces at the air gap, the center pole integrally joined on each axial side thereof by a linking portion to a respective lateral pole to form an axial row of stator poles parallel to the axis of rotation, the linking portions being radially offset, relative to the stator poles, from the air gap; and
      a winding, exclusive to its respective core segment, to develop concurrently, when energized with current, one magnetic polarity in each of the lateral poles and an opposite magnetic polarity in the center pole.

2. A rotary electric motor as recited in claim 1, wherein the surface area of the center pole face of a stator core segment is different from the surface area of a lateral pole face of the respective core segment.

3. A rotary electric motor as recited in claim 1, wherein the core segments are structurally positioned to form two annular sets of lateral poles and one annular set of center poles, each set comprising a respective pole in each of the core segments; and
   the poles of each set are substantially axially coextensive.

4. A rotary electric motor as recited in claim 1, wherein the rotor comprises a plurality of axial rows of permanent magnets disposed circumferentially along the air gap, the magnets of each row being parallel to the axis of rotation and coextensive with each other circumferentially about the axis of rotation.

5. A rotary electric motor as recited in claim 4, wherein each axial row comprises a center permanent magnet of one magnetic polarity and, at each axial side thereof, a lateral permanent magnet of a magnetic polarity opposite to the polarity of the center magnet.

6. A rotary electric motor as recited in claim 4, wherein the magnetic polarities of the permanent magnets of each successive row in the circumferential direction are of alternate magnetic polarity.

7. A rotary electric motor as recited in claim 4, wherein the rotor further comprises a back iron ring upon which the permanent magnets are mounted, the back iron ring comprising a plurality of discontinuous segments, each segment having mounted thereon a corresponding axial row of permanent magnets.

8. A rotary electric motor as recited in claim 7, wherein each back iron segment comprises two separated segment portions, each segment portion bridging the center permanent magnet and a respective lateral permanent magnet of the corresponding axial permanent magnet row.

9. A rotary electric motor as recited in claim 1, wherein the winding comprises coils formed on each linking portion.

10. A cylindrical annular permanent magnet rotor for a rotary electric motor comprising:
    a plurality of axial rows of permanent magnets disposed circumferentially about an axis of rotation, each axial row comprising a center permanent magnet of one magnetic polarity and, at each axial side thereof, a lateral permanent magnet of a magnetic polarity opposite to the polarity of the center magnet, the magnets of each axial row being in alignment with each other in parallel with the axis of rotation and coextensive with each other circumferentially about the axis of rotation; and further comprising,
    a back iron ring upon which the permanent magnets are mounted, the back iron ring comprising a plurality of discontinuous segments, each segment having mounted thereon a corresponding axial row of permanent magnets.

11. A rotary electric motor as recited in claim 10, wherein each back iron segment comprises two separated segment portions, each segment portion bridging the center permanent magnet and a respective lateral permanent magnet of the corresponding axial permanent magnet row.

* * * * *